May 6, 1924.
G. J. SCOFIELD
FRICTION CLUTCH
Filed March 16, 1920
1,493,166
2 Sheets-Sheet 2
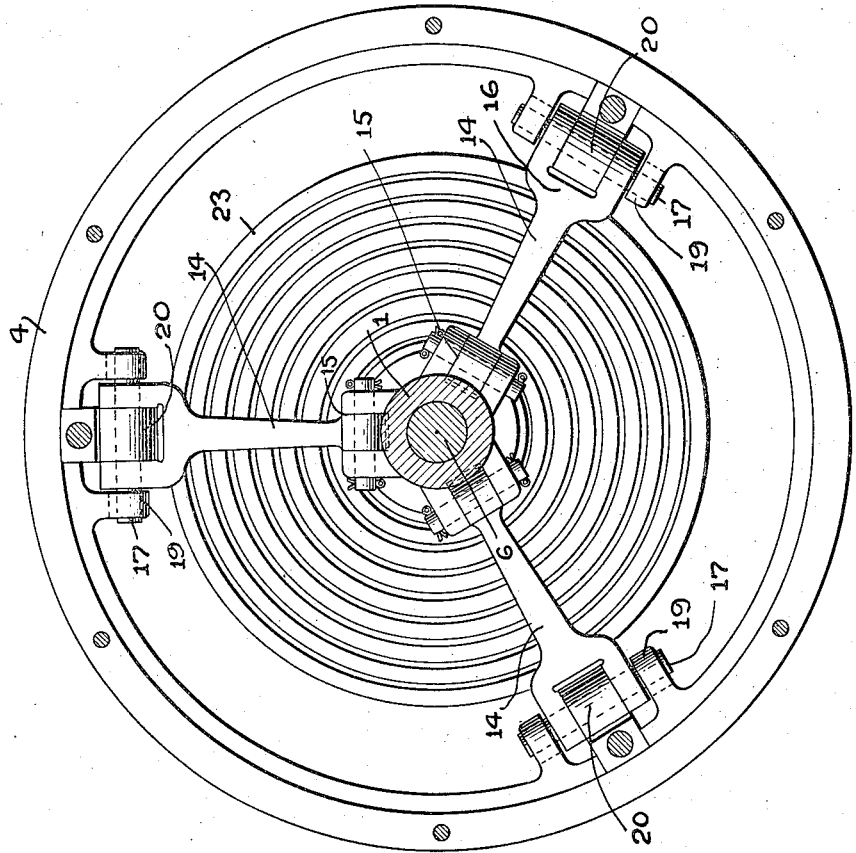
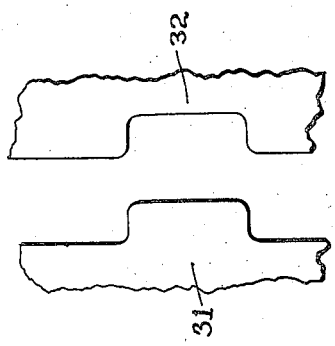
Inventor Patented May 6, 1924.

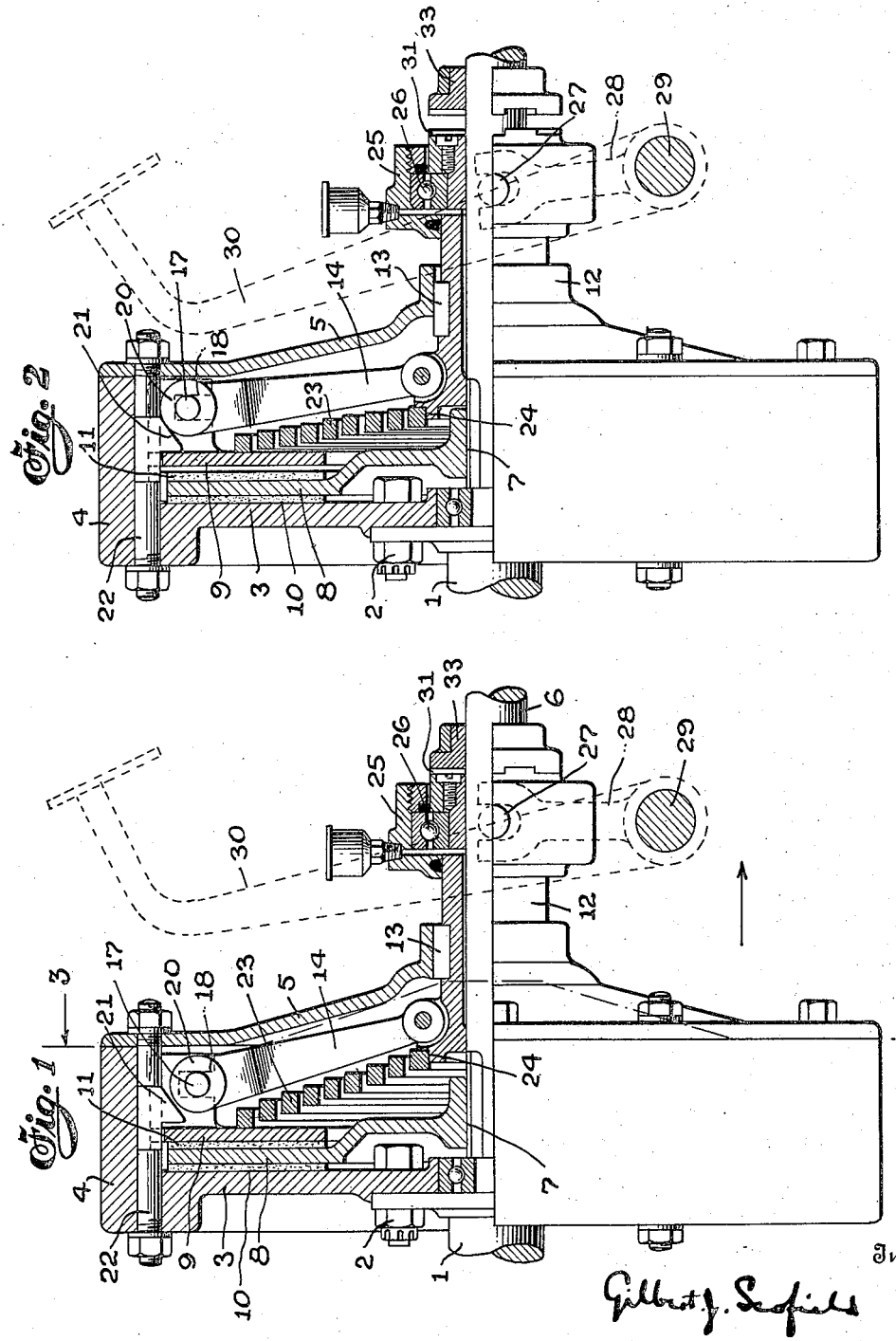

1,493,166

UNITED STATES PATENT OFFICE.

GILBERT J. SCOFIELD, OF TROY, NEW YORK, ASSIGNOR OF ONE-HALF TO HALSTEAD P. COUNCILMAN, OF WATERVLIET, NEW YORK.

FRICTION CLUTCH.

Application filed March 16, 1920. Serial No. 366,202.

*To all whom it may concern:*

Be it known that I, GILBERT J. SCOFIELD, a citizen of the United States, and a resident of Troy, in the county of Rensselaer and State of New York, have invented an Improvement in Friction Clutches, of which the following is a specification.

This invention relates to clutch construction. One of the objects thereof is to provide a simple construction of the above character well adapted to meet the conditions of use. Another object is to provide a practical and efficient friction clutch in which the effect of wear is automatically compensated for. Another object is to provide reliable and effective means for putting the clutch into and out of action. Another object is to provide clutch construction in which slippage is reduced to a minimum consistent with efficient and dependable action. Other objects will be in part obvious and in part pointed out hereinafter.

The invention accordingly consists in the features of construction, combinations of elements and arrangement of parts which will be exemplified in the structure hereinafter described and the scope of the application of which will be indicated in the following claims.

In the accompanying drawings, in which is shown one of various possible embodiments of this invention, Figure 1 is an elevation of the same partially in section;

Figure 2 is a similar view showing the parts released;

Figure 3 is a sectional end elevation, certain parts being removed in order to show the construction more clearly, and the section being taken substantially on the line 3—3 of Figure 1; and Figure 4 is a detail end view of a portion of a positive clutch member.

Similar reference characters refer to similar parts throughout the several views of the drawings.

Referring now to Figure 1 of the drawings, there is shown at 1 a driving shaft which may be the crank shaft of an internal combustion engine upon a motor vehicle. Connected with this shaft as by means of the bolts 2 is a housing 3 which may be so formed and proportioned as to act as the flywheel of the engine. This housing is provided with an outer annular portion 4, to the rear face of which is bolted a cover or housing member 5. It may be noted at this point that the term "rear" is used to indicate the direction indicated by the arrow in Figure 1 of the drawings, the term "forward" of course having an opposite significance. It is also to be noted that the terms "driven" and "driving" are used merely in a relative sense to aid in explaining this embodiment of the invention, and that the direction of drive may be reversed without departing from many of the features of this invention.

At 6 is shown a driven shaft which may be the propeller shaft of a motor vehicle, and this shaft is keyed as at 7 to the inner clutch plate or disk 8, the connection being such that the disk may slide longitudinally of the shaft 7 but is held against turning with respect thereto. The remaining clutch member or gripping plate 9 is of a general annular form and is adapted to be forced toward and away from the web of the housing 3 to grip therebetween the plate 8, suitable friction material being interposed between these parts as at 10 and 11.

Considering now the actuating means for this clutch, there is provided a sleeve 12 which rotates with the housing 3, a splined connection being provided at 13 which however permits a sliding movement of the sleeve with respect to the housing plate 5. At the forward end portion of the sleeve 12 there are provided three or more outwardly extending toggle arms 14 each jointed thereto as shown at 15 in Figure 3 of the drawings. These toggle arms with the clutch in active or power-transmitting position, are considerably inclined with respect to a plane transverse to the shaft 1 as shown in Figure 1 of the drawings. The outer ends of the arms 14 are bifurcated as at 16 and provided with cross pins 17, it being understood that the general construction and connection of each of these arms is identical. The pin 17 at its outer end rests within inwardly directed slots 18 in pairs of ears or lugs 19 formed integral with the movable clutch plate 9. Thus as these pins move forwardly or rearwardly, the plate 9 is forced into gripping position or positively drawn out of such position. The plate 9 rotates with the driving shaft 1 and the flywheel 3, the driving connection being made as above described through the plate 5, key 13, sleeve 12 and arms 14 to the plate 9.

Between the bifurcated ends of the links 14 the pins 17 are provided with rollers 20 respectively adapted to co-act with inwardly directed cam or wedge abutments 21, formed on bolts 22 by which the housing members 3 and 5 are secured together. The co-action of these parts will hereinafter be described in detail.

Interposed between the forward end of the sleeve 12 and the rear surface of the clutch plate 9 is a spring 23 here shown as of a general conical form. This spring seats at its rear end within an annular recess 24 at the forward end of the sleeve and exerts a continuous pressure, tending to force the sleeve rearwardly and the plate 9 in a forward or gripping direction.

The sleeve is moved along the driven shaft 6 by any suitable means. In the present instance there is provided a stationary collar 25 which is mounted on the sleeve as by means of the ball bearing 26. This collar is provided with trunnions 27 about which are forked the short levers 28 on the rock shaft 29. The latter shaft is rocked or oscillated as by means of the foot pedal 30. Thus as the pedal 30 is depressed, the sleeve is forced in a forward direction, whereas upon the pedal being released, the spring 23 urges it to its rearmost position.

The rearward motion of sleeve 12 preferably brings into action at its termination a rigid or jaw clutch on the shaft 6. The sleeve 12 has secured thereto at its rear end a positive clutch member 31 adapted to co-act with a mating clutch member 32 formed on the collar 33 which is secured to the shaft 6. These clutch members may be of any desired specific construction such as that diagrammatically illustrated in Figure 4 of the drawings, the projecting portions on one member intermeshing with corresponding recesses upon the other. Although this latter clutch is preferably of the positive interlocking type, nevertheless a friction clutch element at this point may be substituted and still achieve certain of the advantages of this feature of my invention.

Considering now the action of the parts whereby the main clutch is operated, it is to be understood that in Figure 1 of the drawings they are shown in active or power-transmitting position. In this position the spring 23 is forcing the sleeve rearwardly to bring into action the positive clutch, and at its opposite end is forcing the clutch member 9 forwardly to tightly grip the driven grip the driven plate 8. With the parts so disposed, the rollers 20 are preferably just out of contact with the opposing cam surfaces 21. From this it will be seen that any wear of the parts, such as that of the lining material at 10 or 11, will result merely in the plate 9 being forced forward to compensate for such wear. Whatever degree this wear may have reached, nevertheless the plate 8 will be gripped with undiminished force due to the fact that it has the full pressure of the spring 23 acting upon the plate 9. All of this furthermore is without adjustment of the parts and entirely automatic.

If now it be desired to release the clutch, the pedal 30 is depressed or thrown in a forward direction. This moves the sleeve 12 forwardly and correspondingly advances the inner pivotal connections of all of the arms 14, it being understood that the term "inner" is used with respect to the axis of the shafts. This forward movement, as illustrated in Figure 2 of the drawings, tends to thrust outwardly by a toggle action of all of the arms 14, the outer ends of the arms and brings the rollers 20 first into contact with the cam surfaces 21 and thereupon as their outward movement continues, drives them along these cam surfaces and swings them rearwardly. This rearward motion is positive for it is only by such motion that the outward movement of the rollers can be accommodated. The rearward movement of rollers 20 acting through the pins 17, positively draws the lugs 19 with the plate 9 in a rearward direction. This is continued to any desired extent to fully release the plate 8. It is to be noted that this release is positive and that it requires small effort due to the toggle action of the radial links. When it is desired to again complete power-transmitting connection, the pedal 30 is released whereupon the spring 23 urges apart the sleeve 12 and plate 9, returning the parts to the positions shown in Figure 1 of the drawings.

As the clutch pedal 30 is released, the frictional connection is first made, but just prior to reaching its fully retracted position, the positive connection is made through the jaw clutch. Thus there is achieved a rigid or positive connection which obviates any possibility of the parts slipping and yet the frictional connection is such that the load is partially taken up before the jaws are intermeshed. This of course conduces not only to the life of the jaw clutch but to reducing shock as it is thrown into action. It will also be seen that if it is desired to slip the friction clutch, the pedal 30 is merely depressed to the desired extent, its first movement releasing the jaw clutch and its continued movement pulling back upon the plate 9.

It will thus be seen that there is provided apparatus in which the several objects of this invention are achieved. The parts are few in number and of rugged construction, and also the rotated parts are symmetrically disposed about their axis to rotate. Furthermore, the strain incident to the action of releasing the clutch, such as the radial thrust upon the links, is substantially balanced and neutralized. One spring only is necessary for performing various functions and the essential parts are thoroughly housed, thus protecting them from injury and maintaining them in clean condition.

As various possible embodiments might be made of the above described invention and as various changes might be made in the embodiment hereinbefore set forth, it is to be understood that all matter herein set forth or shown in the accompanying drawings is to be interpreted as illustrative and not in a limiting sense.

I claim as my invention:

1. In clutch construction, in combination, a driving shaft, a clutch member driven thereby, a movable pressure member mounted to turn with said first member, a driven shaft, a plate secured to said driven shaft and adapted to be embraced between said clutch member and said pressure member, a sleeve mounted on said driven shaft, a compression spring interposed between said sleeve and said pressure member and tending to urge said pressure member into gripping position, and means controlled from said sleeve adapted upon movement of said sleeve in one direction to move said pressure member in the opposite direction and away from its gripping position.

2. In clutch construction, in combination, a driving shaft, a clutch member driven thereby, a movable pressure member mounted to turn with said first member, a driven shaft, a plate secured to said driven shaft and adapted to be embraced between said clutch member and its pressure member, a sleeve mounted on said driven shaft, a compression spring interposed between said sleeve and said pressure member and tending to urge said pressure member into gripping position, and means controlled from said sleeve adapted to move said pressure member away from its gripping position, said last means being adapted to permit said spring automatically to force said pressure member to compensate for wear of frictional parts by added travel in its gripping direction.

3. In clutch construction, in combination, a driving clutch member, a movable pressure plate connected to turn therewith, a driven shaft, a rotary member secured to said shaft and interposed between said clutch member and said pressure plate, means providing a cam surface adjacent said pressure plate and connected with said clutch member, and means positively connected with said pressure plate adapted to move along said cam surface in a direction adapted to draw said pressure plate away from said clutch member.

4. In clutch construction, in combination, a driving clutch member, a movable pressure plate connected to turn therewith, a driven shaft, a rotary member secured to said shaft and interposed between said clutch member and said pressure plate, means forming a plurality of cams spaced about the outer portion of said clutch member, a plurality of outwardly directed arms respectively co-acting with said cam surfaces and respectively connected with said pressure plate whereby upon said arms being thrown toward a single plane their outer ends are guided outwardly by said cams and tend to positively move said pressure plate away from said clutch member, and a spring forcing said pressure plate in the opposite direction.

5. In clutch construction, in combination, a driving clutch member, a movable pressure plate connected to turn therewith, a driven shaft, a rotary member secured to said shaft and interposed between said clutch member and said pressure plate, means forming a plurality of cams spaced about the outer portion of said clutch member, a plurality of outwardly directed arms respectively co-acting with said cam surfaces and respectively connected with said pressure plate whereby upon said arms being thrown toward a single plane their outer ends are forced outwardly and tend to positively move said pressure plate away from said clutch member, a spring forcing said pressure plate in the opposite direction, and a movable sleeve on said driven shaft to which the inner ends of said arms are jointed and between which and said pressure plate said spring is compressed.

6. In clutch construction, in combination, a movable clutch member, a clutch member toward which it is movable into power-transmitting relation, a driven shaft to which said second clutch member is connected, a sleeve upon said shaft, a compression spring interposed between the end of said sleeve and said movable clutch member and tending to force the latter into power-transmitting position, an outwardly extending normally inclined link jointed to said sleeve and having its outer end forming a slotted connection with said movable clutch member, and means forming a cam surface to which the outer end of said link is operatively connected and shaped to throw said first clutch member away from said second clutch member as said sleeve is moved along said shaft.

7. In clutch construction, in combination, a driven shaft, a clutch member fixed to turn therewith, a driving clutch member provided with relatively movable parts between which said first clutch member is adapted to be gripped, spring actuated means adapted to actuate the parts of said second clutch member to move them into gripping position, positively operated means adapted to force the parts out of gripping position and means adapted at the last stage of said gripping movement to form an independent positive power-transmitting connection between said second clutch member and said driven shaft.

8. In clutch construction, in combination, a driving member, a driven member, a pair of members adapted to make frictional engagement one with another and respectively connected to said driving member and said driven member, a spring mounted to urge the members of said pair into engagement one with another irrespective of the degree of wear of their frictional surfaces, a positive clutch adapted to make power-transmitting connection between said driving member and said driven member, and a plurality of members mounted on a sleeve forming a toggle mechanism adapted progressively to permit said spring to urge the members of said pair into frictional engagement and then to render operative said positive clutch.

9. In clutch construction, in combination, a driving member, a driven member, a pair of clutch members adapted to make frictional engagement one with another to connect said driving member and said driven member, a pair of clutch members adapted to make positive engagement one with another to connect said driving member and said driven member, a spring interposed between said two pairs of clutch members adapted to urge both of said pairs into engagement, and a movable sleeve on said driven member connected to said spring and adapted by continuous movement in one direction to render inoperative said positive clutch and thereupon positively pull said first clutch members apart in opposition to said spring.

10. In clutch construction, in combination, a pair of members adapted to make frictional engagement one with another, means adapted to drive one of said members from the other of said members, a positive clutch adapted to make independent connection between said driving and said driven means, a sleeve on said driven means connected to one of said friction members and to said positive clutch adapted by a continuous movement in one direction to render inoperative said positive clutch and to positively move said pair of frictional members apart, means adapted to move said sleeve, and a single compression spring acting independently of said last means to press one of said frictional members into frictional engagement with the other, and to urge said positive clutch toward operative position.

11. In clutch construction, in combination, a driven member, a friction clutch member thereon, a driving member, a sleeve movable along said driven member connected to rotate with said driving member, a second friction clutch member adapted to make frictional engagement with said first clutch member, a spring interposed between said sleeve and said second clutch member adapted to force the latter into engagement with said first clutch member, and means adapted to simultaneously move said sleeve and said second clutch member toward each other against the action of said spring therebetween.

12. In clutch construction, in combination, a driven member, a friction clutch member thereon, a driving member, a sleeve movable along said driven member connected to rotate with said driving member, a second friction clutch member adapted to make frictional engagement with said first clutch member, a spring urging said two friction members together, and toggle arms connecting said sleeve and said second friction clutch member and adapted upon movement of said sleeve member along said driven member to draw said clutch members apart against the action of said spring.

13. In clutch construction, in combination, a driving clutch member, a movable pressure plate connected to turn therewith, a driven shaft, a plate member secured to said driven shaft and interposed between said clutch member and said pressure member, means forming a plurality of cams spaced about the outer portion of said clutch member, a plurality of outwardly directed arms respectively coacting with said cam surfaces and respectively connected with said pressure plate adapted upon being thrown toward a single plane to bear outwardly against said cams and be guided thereby in a direction to draw said pressure plate away from said clutch member, resilient means urging said pressure plate in the opposite direction, and a movable sleeve on said driven shaft to which the inner ends of said arms are jointed and by means of which they are thrown toward a single plane.

14. In clutch construction, in combination, a movable clutch member, a clutch member toward which it is movable into power-transmitting relation, a driven shaft to which said second clutch member is connected, a sleeve upon said shaft, compression means urging said movable clutch member toward power-transmitting position, an outwardly extending normally inclined link jointed to said sleeve and having its outer end forming a slotted connection with said movable clutch member, and means forming a cam surface to which the outer end of said link is operatively connected and shaped to throw said first clutch member away from said second clutch member as said sleeve is moved along said shaft.

15. In clutch construction, in combination, a friction clutch member, a second friction clutch member adapted to make engagement with said first friction clutch member and mounted for movement toward and away from the same, a member movable toward said second clutch member in the direction of the movement of the latter toward position of engagement, a plurality of arms positively connected at one end with said member and having slotted connections with said second clutch member at their other ends, and means coacting with the ends of said arms adjacent said second clutch member adapted upon movement of said member toward said second clutch member to move said arms in a direction to draw said second clutch member away from engagement with said first clutch member.

16. In clutch construction, in combination, a friction clutch member, a second friction clutch member mounted for movement into and out of engagement with said first friction clutch member, a member movable toward said second clutch member in the direction of its movement toward position of engagement, a plurality of toggle arms positively connected at one end with said last member and forming a connection between the same and said second clutch member and means adapted upon movement of said member toward said second clutch member to utilize the longitudinal thrust in said toggle arms occasioned by said movement to move said second clutch member in a direction away from engagement with said first clutch member.

In testimony whereof, I have signed my name to this specification this 12th day of March 1920.

GILBERT J. SCOFIELD.